US007672892B2

(12) United States Patent
Odom et al.

(10) Patent No.: US 7,672,892 B2
(45) Date of Patent: Mar. 2, 2010

(54) REAL TIME NETWORK EXCHANGE WITH SELLER SPECIFIED EXCHANGE PARAMETERS AND INTERACTIVE SELLER PARTICIPATION

(76) Inventors: James Michael Odom, 320 Garfield B, Santa Fe, NM (US) 87501; Scott D. Yelich, 2500 Sawmill Rd. #1825, Santa Fe, NM (US) 87505

(*) Notice: Subject to any disclaimer, the term of this patent is extended or adjusted under 35 U.S.C. 154(b) by 0 days.

(21) Appl. No.: 09/532,684

(22) Filed: Mar. 21, 2000

(65) Prior Publication Data
US 2002/0072978 A1    Jun. 13, 2002

Related U.S. Application Data

(63) Continuation of application No. 08/891,633, filed on Jul. 11, 1997, now Pat. No. 6,058,379.

(51) Int. Cl.
*G06Q 40/00* (2006.01)
(52) U.S. Cl. .......................................... 705/37; 705/35
(58) Field of Classification Search ............. 705/35–40, 705/26, 42
See application file for complete search history.

(56) References Cited

U.S. PATENT DOCUMENTS

| | | | |
|---|---|---|---|
| 3,573,747 A | | 4/1971 | Adams et al. |
| 3,581,072 A | | 5/1971 | Nymeyer |
| 4,321,672 A | * | 3/1982 | Braun et al. .................. 705/42 |
| 4,363,489 A | | 12/1982 | Chodak |
| 4,412,287 A | | 10/1983 | Braddock, III |
| 4,674,044 A | | 6/1987 | Kalmus et al. |
| 4,677,552 A | | 6/1987 | Sibley, Jr. |
| 4,751,640 A | * | 6/1988 | Lucas et al. .................. 705/36 |
| 4,757,267 A | | 7/1988 | Riskin |
| 4,764,666 A | | 8/1988 | Bergeron |
| 4,789,928 A | | 12/1988 | Fujisaki |

(Continued)

FOREIGN PATENT DOCUMENTS

EP    0628919    12/1994

(Continued)

OTHER PUBLICATIONS

David M. Brownstone and Irene M. Frank "The VNR Investor's Dictionary" (1981) Van Nostrand Reinhold Company, p. 70.*

(Continued)

*Primary Examiner*—Narayanswamy Subramanian
(74) *Attorney, Agent, or Firm*—Christensen O'Connor Johnson Kindness PLLC

(57) ABSTRACT

A system and method for networked exchange are disclosed. A system for networked exchange comprises an internal proxy; an exchange processor in communication with the internal proxy; a database in communication with the internal proxy; an external proxy in communication with the internal proxy; and, a communications network connected to the external proxy. A method for networked exchange comprises 8 steps. Those steps are (1) specifying a mode of operations for an exchange; (2) identifying a commodity for the exchange; (3) listing information about the commodity; (4) accessing of the listing by a potential purchaser; (5) accessing the network-based exchange by the potential purchaser; (6) processing information generated by the potential purchaser, the information comprising a negotiation; (7) concluding the negotiation; and, (8) clearing the concluded negotiation.

30 Claims, 8 Drawing Sheets

U.S. PATENT DOCUMENTS

| | | | |
|---|---|---|---|
| 4,799,156 A | 1/1989 | Shavit et al. | |
| 4,845,636 A | 7/1989 | Walker | |
| 4,870,576 A | 9/1989 | Tornetta | |
| 4,903,201 A | 2/1990 | Wagner | |
| 4,980,826 A | 12/1990 | Wagner | |
| 4,992,940 A | 2/1991 | Dworkin | |
| 5,032,989 A | 7/1991 | Tornetta | |
| 5,077,665 A | 12/1991 | Silverman et al. | |
| 5,101,353 A * | 3/1992 | Lupien et al. | 705/37 |
| 5,136,501 A | 8/1992 | Silverman et al. | |
| 5,168,446 A | 12/1992 | Wiseman | |
| 5,243,515 A | 9/1993 | Lee | |
| 5,276,312 A | 1/1994 | McCarthy | |
| 5,283,731 A | 2/1994 | Lalonde et al. | |
| 5,297,031 A | 3/1994 | Gutterman et al. | |
| 5,305,200 A | 4/1994 | Hartheimer et al. | |
| 5,319,542 A | 6/1994 | King, Jr. et al. | |
| 5,329,589 A | 7/1994 | Fraser et al. | |
| 5,451,998 A | 9/1995 | Hamrick | |
| 5,489,096 A | 2/1996 | Aron | |
| 5,495,412 A | 2/1996 | Thiessen | |
| 5,517,406 A | 5/1996 | Harris et al. | |
| 5,518,239 A | 5/1996 | Johnston | |
| 5,546,582 A | 8/1996 | Brockmeyer et al. | |
| 5,553,145 A | 9/1996 | Micali | |
| 5,557,518 A | 9/1996 | Rosen | |
| 5,572,643 A | 11/1996 | Judson | |
| 5,576,951 A | 11/1996 | Lockwood | |
| 5,592,212 A | 1/1997 | Handelman | |
| 5,592,375 A | 1/1997 | Salmon et al. | |
| 5,615,269 A | 3/1997 | Micali | |
| 5,655,088 A | 8/1997 | Midorikawa et al. | |
| 5,664,115 A | 9/1997 | Fraser | |
| 5,666,493 A | 9/1997 | Wojcik et al. | |
| 5,673,322 A | 9/1997 | Pepe et al. | |
| 5,701,451 A | 12/1997 | Rogers et al. | |
| 5,710,887 A | 1/1998 | Chelliah et al. | |
| 5,715,314 A | 2/1998 | Payne et al. | |
| 5,715,402 A | 2/1998 | Popolo | |
| 5,715,453 A | 2/1998 | Stewart | |
| 5,724,522 A | 3/1998 | Kagami et al. | |
| 5,724,524 A * | 3/1998 | Hunt et al. | 705/37 |
| 5,727,165 A | 3/1998 | Ordish et al. | |
| 5,732,400 A | 3/1998 | Mandler et al. | |
| 5,743,525 A | 4/1998 | Haddad | |
| 5,743,798 A | 4/1998 | Adams | |
| 5,745,383 A | 4/1998 | Barber | |
| 5,749,785 A | 5/1998 | Rossides | |
| 5,757,917 A | 5/1998 | Rose et al. | |
| 5,758,328 A | 5/1998 | Giovannoli | |
| 5,764,889 A | 6/1998 | Ault et al. | |
| 5,768,382 A | 6/1998 | Schneier | |
| 5,779,547 A | 7/1998 | SoRelle | |
| 5,790,677 A | 8/1998 | Fox et al. | |
| 5,794,207 A | 8/1998 | Walker et al. | |
| 5,794,210 A | 8/1998 | Goldhaber et al. | |
| 5,799,151 A | 8/1998 | Hoffer | |
| 5,799,284 A | 8/1998 | Bourquin | |
| 5,799,285 A | 8/1998 | Klingman | |
| 5,805,823 A | 9/1998 | Seitz | |
| 5,809,144 A | 9/1998 | Sirbu et al. | |
| 5,815,665 A | 9/1998 | Teper et al. | |
| 5,826,244 A | 10/1998 | Huberman | |
| 5,830,068 A | 11/1998 | Brenner | |
| 5,832,228 A | 11/1998 | Holden et al. | |
| 5,835,896 A | 11/1998 | Fisher et al. | |
| 5,842,178 A | 11/1998 | Giovannoli | |
| 5,845,265 A | 12/1998 | Woolston | |
| 5,850,442 A | 12/1998 | Muftic | |
| 5,862,223 A | 1/1999 | Walker et al. | |
| 5,870,719 A | 2/1999 | Maritzen et al. | |
| 5,873,071 A | 2/1999 | Ferstenberg et al. | |
| 5,873,782 A | 2/1999 | Hall | |
| 5,884,309 A | 3/1999 | Vanechanos, Jr. | |
| 5,890,138 A | 3/1999 | Godin et al. | |
| 5,897,620 A | 4/1999 | Walker et al. | |
| 5,905,974 A | 5/1999 | Fraser et al. | |
| 5,905,975 A | 5/1999 | Ausubel | |
| 5,909,492 A | 6/1999 | Payne et al. | |
| 5,924,082 A | 7/1999 | Silverman et al. | |
| 5,924,083 A | 7/1999 | Silverman et al. | |
| 5,947,317 A * | 9/1999 | Hall | 220/269 |
| 5,950,176 A | 9/1999 | Keiser et al. | |
| 5,950,177 A | 9/1999 | Lupien et al. | |
| 5,950,178 A | 9/1999 | Borgato | |
| 5,963,923 A | 10/1999 | Garber | |
| 5,963,952 A | 10/1999 | Smith | |
| 5,970,475 A | 10/1999 | Barnes et al. | |
| 5,991,739 A | 11/1999 | Cupps et al. | |
| 5,999,808 A | 12/1999 | LaDue | |
| 6,012,045 A | 1/2000 | Barzilai et al. | |
| 6,014,627 A | 1/2000 | Togher | |
| 6,014,643 A | 1/2000 | Minton | |
| 6,021,398 A | 2/2000 | Ausubel | |
| 6,029,146 A | 2/2000 | Hawkins | |
| 6,029,150 A | 2/2000 | Kravitz | |
| 6,035,288 A | 3/2000 | Solomon | |
| 6,055,519 A | 4/2000 | Kennedy et al. | |
| 6,058,378 A * | 5/2000 | Clark et al. | 705/37 |
| 6,058,379 A | 5/2000 | Odom et al. | |
| 6,061,665 A | 5/2000 | Bahreman | |
| 6,070,798 A | 6/2000 | Nethery | |
| 6,134,536 A | 10/2000 | Shepherd | |
| 6,203,427 B1 | 3/2001 | Walker | |
| 6,227,972 B1 | 5/2001 | Walker et al. | |
| 6,321,212 B1 | 11/2001 | Lange | |
| 6,507,823 B1 * | 1/2003 | Nel | 705/26 |
| 6,527,638 B1 | 3/2003 | Walker et al. | |
| 7,133,835 B1 * | 11/2006 | Fusz et al. | 705/26 |
| 2002/0046137 A1 | 4/2002 | Odom et al. | |
| 2002/0072978 A1 | 6/2002 | Odom et al. | |
| 2002/0116314 A1 * | 8/2002 | Spencer et al. | 705/37 |
| 2002/0174066 A1 * | 11/2002 | Kleckner et al. | 705/39 |
| 2002/0194115 A1 * | 12/2002 | Nordlicht et al. | 705/37 |
| 2004/0107158 A1 * | 6/2004 | Odom et al. | 705/37 |
| 2005/0131809 A1 * | 6/2005 | Watt et al. | 705/39 |
| 2006/0026090 A1 * | 2/2006 | Balabon | 705/37 |
| 2006/0161495 A1 * | 7/2006 | Wigzell | 705/37 |
| 2007/0118459 A1 * | 5/2007 | Bauerschmidt et al. | 705/37 |
| 2007/0265954 A1 * | 11/2007 | Mather et al. | 705/37 |
| 2009/0240630 A1 * | 9/2009 | Casey et al. | 705/80 |
| 2009/0248564 A1 * | 10/2009 | Fallon et al. | 705/37 |

FOREIGN PATENT DOCUMENTS

| | | | |
|---|---|---|---|
| JP | 60151781 A * | 8/1985 | |
| JP | 2064863 | 3/1990 | |
| JP | 4247567 | 9/1992 | |
| JP | 4319800 | 11/1992 | |
| JP | 5165856 | 7/1993 | |
| JP | 7073243 | 3/1995 | |
| JP | 7230502 | 8/1995 | |
| JP | 8115361 | 5/1996 | |
| JP | 8147363 | 6/1996 | |
| JP | 8314972 | 11/1996 | |
| JP | 3037513 | 2/1997 | |
| JP | 9034965 | 2/1997 | |
| JP | 9073484 | 3/1997 | |
| JP | 9081513 | 3/1997 | |
| WO | WO 97/22074 | 6/1997 | |

OTHER PUBLICATIONS

"World's First Real Time Travel Auction Service to be Available Via World Wide Web; ETA to Open Bidding to Consumers, Travel Industry; Web Auction Leader eBay to Provide Technology Support," *Business Wire*, p. 11041146, Nov. 4, 1996.

"EBAY: eBay's AuctionWeb tops one million bids; leading online auction service announces record year," *M2 Presswire*, M2 Communications, Dec. 12, 1996.

EBAY website (www.ebay.com) screen displays, Dec. 23, 1998.

"MetalSite: Global Metals Marketplace," http://www.metalsite.net/MetalSite_Is/metalsite_index.cfm, 1 page (printed Sep. 25, 2000).

Enos, "New Products/Services Roundup," E-Commerce Times, http://www.ecommercetimes.com/printer/, 2 pages (Mar. 10, 2000).

"NexTag: About Us," wysiwyg://109/http://www.nextag.com/serv/main/about/about.jsp, 1 page (printed Sep. 25, 2000).

"VerticalNet, Inc., the Internet's . . . s and industrial trade communities," http://www.verticalnet.com/solutions/auctions.asp, 1 page (printed Sep. 25, 2000).

Yen et al., "Intelligent Clearinghouse: Electronic Marketplace with Computer-Mediated Negotiation Supports," Proceedings of the 29th Annual Hawaii International Conference on System Sciences, pp. 219-225 (1996).

"Method for Computerized Wagering," U.S. Appl. No. 10/013,776, filed Dec. 7, 2001; inventors: James M. Odom and Scott D. Yelich.

"EC Brings About New Business Opportunities," Fujitsu Journal, vol. 22, No. 4, pp. 46-47 (Oct. 1996).

Kaneda et al., "Home Shopping System for Mitaka INS Model System—TELECOM-Shopping System," Hitachi Hyouron, vol. 67, No. 10, pp. 41-46 (Oct. 1985).

Sakuma et al., "Tokyu Home Shopping System Using INS Model System in Mitaka Region," Hitachi Hyouron, vol. 67, No. 10, pp. 47-52 (Oct. 1985).

"Status-Quo of NIFTY-Serve," Fujitsu Journal, vol. 15, No. 6, pp. 16-23 (Jul. 1989).

"Home Trade Service Using PC Communication," Fujitsu Journal, vol. 15, No. 13, pp. 12-15 (Dec. 1989).

"KURONEKO Book Ordering Service & Online Shopping," Fujitsu Journal, vol. 15, No. 13, pp. 22-25 (Dec. 1989).

Ohta et al., "Electronic Money Schemes," NTT R&D, vol. 44, No. 10, p. 931(69)-938(76) (Oct. 1995).

James E. White, "Telescript Technology: Scenes from the Electronic Marketplace," Computer and Network LAN, pp. 101-111 (May 1996).

"Activities of Commerce-Net Japan," NTT Technology Journal, pp. 23-26 (Jul. 1996).

Matsuhashi, et al., "A Study on WWW based EC for Flower Marketplace," Office Automation, vol. 18, No. 4-2, pp. 95-98 (Oct. 1997).

Lewis, "CORBA 2.0: Universal Networked Objects," StandardView, vol. 3, No. 3, pp. 102-106 (Sep. 1995).

"World Wide Web," WWWebster Dictionary, http://www.m-w.com/cgi.bin/dictionary?book=Dictionary&va=world+wide+web, 1 page (printed Dec. 1998; difinition dated 1992).

"World Wide Web," A Web of On-line Dictionaries, http://www.facstaff.bucknell.edu/rbeard/diction.htmll, 1 page (printed Dec. 1998).

Online Shoppers: Online Shoppers Shop the Longest at eBay, 2 pages (Nov. 3, 1997).

Giles, "Electronic Commerce," Network VAR, vol. 5, p. 26(7) (May 1997).

"Comauction.com The e-Business Asset Interchange," http://www.comauction.com/unique.html, 1 page (printed Sep. 25, 2000).

"Rebound: Seller Services Menu," http://www.rebound.com/menuSeller.msp, 1 page (printed Sep. 25, 2000).

Hillebrand, "Printing Industry Finds Home on the Web," E-Commerce Times, http://www.ecommercetimes.com/printer/, 2 pages (Aug. 31, 1999).

Burns, G., "The 'Election Futures' Market: More Accurate Than Polls?" BusinessWeek, Nov. 11, 1996, <http:// www.businessweek.com/1996/46/b3501116.htm> [retrieved Jul. 16, 2008], 3 pages.

\* cited by examiner

REAL TIME NETWORK EXCHANGE WITH SELLER SPECIFIED EXCHANGE PARAMETERS AND INTERACTIVE SELLER PARTICIPATION

This application is a continuation of U.S. application Ser. No. 08/891,633 filed Jul. 11, 1997, now U.S. Pat. No. 6,058,379.

FIELD OF THE INVENTION

This invention relates generally to the electronic exchange of goods and services via an electronic network and, more particularly, to a system and method for networked exchange.

BACKGROUND OF THE INVENTION

All trade is based upon new needs brought on as a result of new technology—the advent of long term human habitats over the old style of hunting and gathering brought about the need for trading for items which were not or could not be autonomously made. The need to establish a new type of trading process, beyond the barter system, brought about an establishment of a medium of exchange (e.g., money). This has evolved over the ages into modern day commerce with monetary exchanges, stock markets, supermarkets, gas stations, flea markets, swap meets, etc. However, many of the globally employed systems may not be as efficient, or as fair as possible, since they rely on third party interaction or are based around a set market style or process. The utopian vision of a marketplace would be where the utility of the marketplace allowed for an individual to achieve the most efficient and advantageous level of transaction negotiation, fairest market value, protected and guaranteed clearing for a commodity or service.

Ancient people invented money by placing fixed values on certain items such as shells, beads, stones, and even salt, with ingots being the most common form of money. Ingots were clumps of precious metal in no particular shape or size with their worth depending on their mineral content and weight. Their value was high because these metals were hard to find and difficult to mine. Ingots were not a panacea, though, and posed some problems for merchants even after being weighed. The greatest of these was determining true value because the content and purity of ingots varied. A partial solution for this dilemma was solved by stamping them with seals. Each seal displayed a description of the metal content, as well as a declaration of its weight. Even with the use of seals, unscrupulous traders would shave some of the metal off the ingot from the opposite side from the seal, thus depreciating the value. Despite these incipient problems associated with development, the world monetary system has evolved from ingots and ancient coinage to wire transfers, debit and credit cards and from primitive barter to currency exchanges, stock markets and intertwined global markets.

The Internet and world wide web (WWW) provide the first true continuous world wide communications structure open to the individual. This allows for new ways to address global commerce. There are several different methods in which commerce may be implemented as there are a vast variety of commodities and services that are in need of being traded. The concept of using the Internet as a marketplace or auction forum is not particularly unique or difficult of an endeavor. The current technology of using E-mail and a telephone for notification employed by existing firms in closed environments has a rather low entry threshold of complexity. This method can be duplicated quite easily and has limited or no room for evolution. However, digital technology lends itself quite readily to real-time high-volume transactions made by multiple participants using shared information. Businesses are moving to digital technologies and this leads to a need to invent new technology and processes to fill the utility.

Commerce systems over the Internet are known in the art. Most of these systems operate on a post and match process; that is, the systems work by having a prospective buyer bid on an item, and if the bid matches the seller's specified selling price, the item is sold to the buyer. The bid and notification may not be processed in real time. Additionally, the seller does not have the ability to intervene once the exchange process has been initiated—once the offer for sale or exchange is made, the seller is isolated from the transaction until it is complete.

Previous networked commerce systems do not allow a user to bid automatically on an item. Thus, in order to stay apprised of what is being offered for sale, a person or a representative would have to remain on the network constantly. Additionally, most systems require participants to be registered members of a system where sellers may be restricted only to merchants, and most rely on credit card transactions. It is difficult for a prospective buyer to search for the exact item that he is looking for without a considerable input of time. Finally, in systems that involve the sale of stocks, operations are still routed through a brokerage firm, and the system itself is essentially an order placing service.

SUMMARY OF THE INVENTION

It is an object of the invention to provide an improved electronic network-based exchange system that overcomes these and other deficiencies of prior systems.

It is a further object of the invention to provide such an exchange that operates and clears on a real-time basis.

It is a further object of the invention to provide such an exchange that provides flexibility, for example, to enable a seller to determine the style and parameters of a particular exchange such as whether the exchange is "open" or "closed."

It is a further object of this invention to provide a real-time electronic network-based exchange that is interactive, for example, to enable a seller to intervene at any time during the exchange process.

It is a further object of the invention to provide such an exchange that provides filtering (e.g., filtering of bid information) to ensure compliance with predetermined criteria, to avoid unnecessary use of system resources and for other purposes.

It is a further object of the invention to provide such an exchange that enables classification and categorization of items to be exchanged to enable various search techniques and facilitate location of items of interest.

It is a further object of the invention to provide such an exchange that provides flexibility of a push or pull system.

It is a further object of the invention to provide such an exchange that provides a proxy with processing to provide security and conserve system resources.

It is a further object of the invention to provide such an exchange that provides an improved graphical presentation of exchange information, such as current and/or past bid information.

It is a further object of the invention to provide such an exchange that provides advanced client-side functionalities and capabilities, including artificial intelligence and agents style behaviors.

In order to accomplish these and other objects of the invention, an electronic network-based exchange system is provided that comprises a server system for hosting transaction operations, and client terminals connected to the server via a communications network. Various client/server architectures may be used. The exchange host is operated by an exchange operator. Sellers and buyers access the exchange to list items and bid on listed items via client terminals. The server side of the system preferably comprises at least one database, an internal proxy, an external proxy, an exchange processor and a listing. The client side can be any suitable client terminal. Separate client software for sellers and buyers may be provided, or both may be provided together.

According to one embodiment of the invention, the system enables the capability to operate an exchange that is based on at least an eight-step capability. In step one, the mode of operation of the exchange is specified. In this step, parameters such as the start/stop time for the exchange, the exchange's open or closed status, public or private access to negotiations, seller information, bid requirements, etc. may be specified. This may be done by the seller and/or auction host. Next, the proposed exchange item can be further identified. This information may include entering information about the item to be sold, which may include its classification, pricing information, etc. Next, the proposed item is added to an electronic listing. This may include posting the information on a world wide web page. Next, on the client side, a potential purchaser accesses the listing information. For example, the potential purchaser may view listed items. If desired, the potential purchaser accesses the exchange. This includes the opportunity to "chat" (e.g., to electronically obtain additional information about a listed item or auction terms) and bid on a listed item. Next, if a bid is made, the client passes the bid information to the server side to be processed. This processing may include a first level of filtering to determine if the bid meets predefined criteria or rates. If it does not, it is rejected. If it does, it is passed on for further processing. For example, it may be compared to previous bids to determine if it is the current best bid. Additional bids can be similarly processed. Upon the occurrence of some event, the opportunity for bidding on an item is concluded. This may be done on an automatic basis, or it may be done manually through transaction control. For example, transaction control may be exercised by the seller (e.g., when an acceptable bid is received). Upon conclusion of the bidding, a clearing process is performed. Various clearing mechanisms may be used.

This system precludes traditional exchange market systems in that it provides a vehicle in which the individual is empowered to circumvent third parties to ensure that exchanges are as fair as possible as well as provide a mechanism to facilitate the migration of trading to the form and process it will take in the future.

A technical advantage of the present invention is that a system and method for networked exchange is provided. Another technical advantage is that the invention provides real-time exchange to occur over a network. Another technical advantage is that the seller can set the parameters of the exchange. Another technical advantage is that the exchange is interactive, allowing the seller to intervene at any time during the exchange process.

DETAILED DESCRIPTION OF THE PREFERRED EMBODIMENTS

Figure 1:
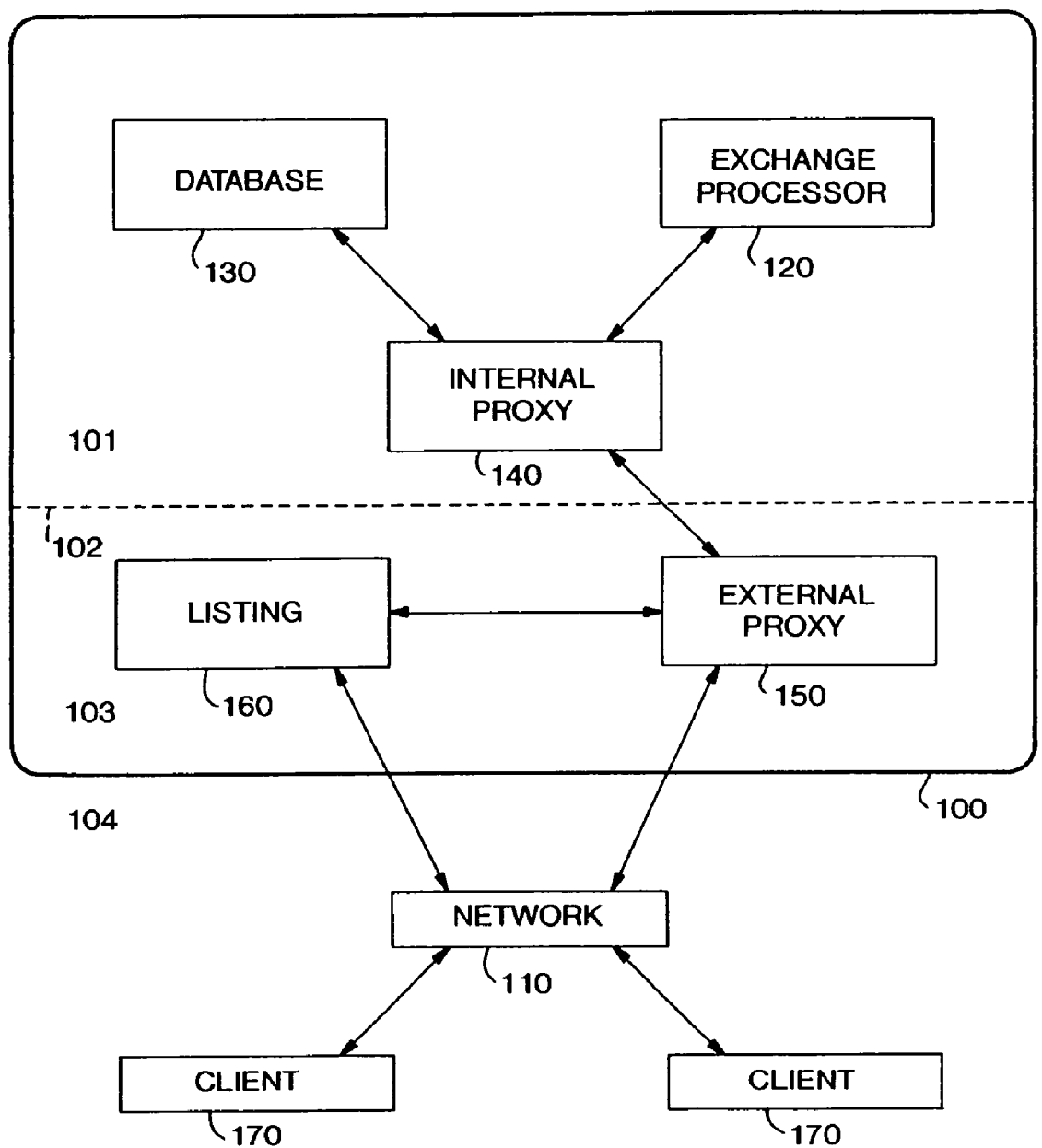
FIG. 1 is a overall system block diagram according to one embodiment of the invention.

FIG. 1 is a block diagram of an electronic network-based exchange system according to one embodiment of the present invention. Preferably, the general architecture used is a client/server architecture. Client/server architectures, per se, are generally known. As shown in FIG. 1, the server side comprises an exchange provider 100, which may further comprise at least one database 130, exchange processor 120, internal proxy 140, listing 160, and external proxy 150. Exchange provider 100 is connected to one or more clients 170 via network 110.

If desired, exchange provider 100 may include at least two portions. In a preferred embodiment, exchange provider 100 consists of two portions. The first portion comprises an internal portion 101, which may include database 130, exchange provider 120, and internal proxy 140. The second portion comprises external portion 103, which may include the listing 160 and external proxy 150. Internal portion 101 may be separated by security means 102 from external portion 103. Security means 102 may be a firewall or similar security providing device to prevent unauthorized access to certain portions of the server side component.

Database 130 is a primary data storage mechanism and communicates with internal proxy 140. It is responsible for storing data and other information relating to system operation. Such information may include, system parameters, item records, account information, exchange accounting information and other information. Database 130 may be any conventional database, including multiple databases or distributed databases.

Exchange processor 120 is a controller that performs the function of managing the exchange or auction. Any suitable controller may be used. Exchange processor 120 communicates directly with internal proxy 140. It receives bids, processes the bids and reports out to the internal proxy.

Internal proxy 140, which itself may be a server, may be used to sanitize, authenticate, filter and route communications (e.g., chat) and assist in the clearing process. Proxies, per se, are generally known. However, particular functions are performed by internal proxy 140. For example, internal proxy 140 communicates directly with database 130 and exchange processor 120, and may link the internal portion 101 to external proxy 150 or other components of the informal portion 103. More than one internal proxy 140 may be provided. Preferably, clients cannot directly access the internal proxy. Proxy 140 may be on a firewall.

Listing 160, which may be a database, web server or other suitable mechanism provides information about items listed for exchange. Listing 160 is client accessible via external proxy 150 and network 110. One or more than one listing 160 may be provided per exchange.

External proxy 150 is responsible for security, filtering, and routing. External proxy 150 communicates with internal proxy 140, listing 160, and network 110. One or more than one external proxy 150 may be provided per exchange. External proxy 150 prevents direct client access to the internal portion 101. It may be used to prevent unwanted or undesired information from entering the exchange.

Network 110 may be any medium (wired or wireless) that allows for communications between components of the invention (e.g., clients and servers) and need not be homogeneous throughout the communications paths of the invention.

Figure 2:
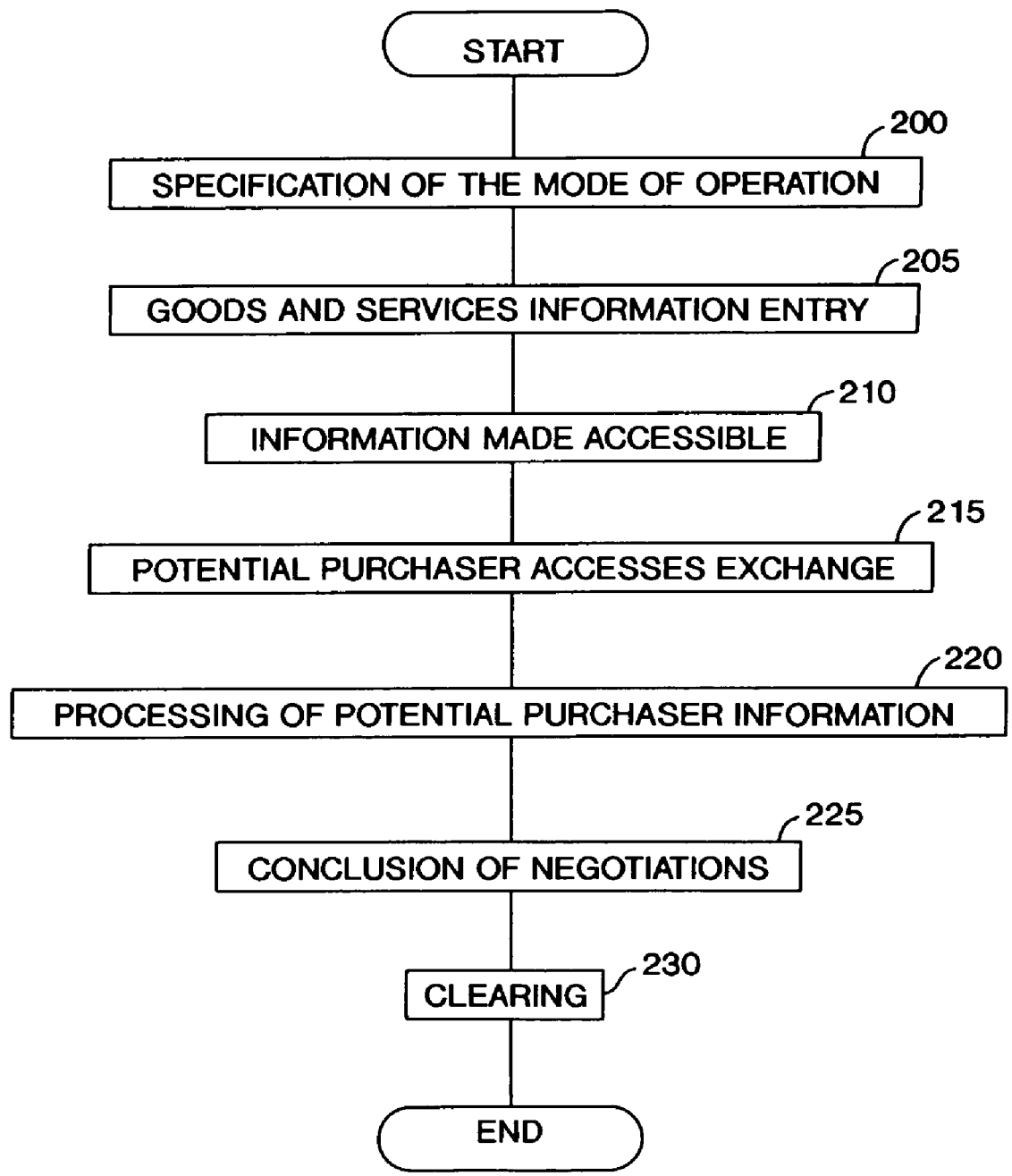
FIG. 2 depicts the exchange process according to a preferred embodiment of the invention.

A preferred embodiment of the invention operates according to FIG. 2 It is assumed that the host has been configured. In step 200, the mode of operation of the exchange is specified. For example, it is specified how the exchange will work and what rules it will work under. Information that may be entered during this phase may include, inter alia, the start and stop time for the exchange, the categorization of the commodity (e.g., as either a good or a service), the aspects of the exchange that will be "open" and those that will be "closed," whether there will be public or private access to negotiations, and whether or not seller intervention will be allowed. Other rules and terms may be specified. This information is stored in the server and used to control a given exchange In step 205, commodity information is entered by the seller. The term commodity or item can include goods or services. This information may include identification of a new commodity or modification of an existing listing by an authorized person. Such information may include system required administrative information such as exchange rules (parameters for that item) seller identification, identification of the item, a major and/or minor classification, pricing information, and other terms. Other options available to a seller client include the ability to search/list items, modify/remove items, intervene in an exchange (e.g., terminate bidding or an item listed by the seller), electronic chat, and reviewing the history/status of bids. If the client selects viewing an item by identifier (e.g., an alpha-numeric), the client may be prompted for the identifier that a particular item is assigned. The client may have retained this number from a previous session, or may have received the number via accessing the listing service. If the client enters a valid identifier, the buyer may be shown the item, information about the item, or both.

In step 210, the listing information is made accessible to the public. This may include posting information on a world wide web page that the public can access. Additionally, an automatic identification may be used to send E-mail to potential purchasers. Other means of making the information accessible may also be used. The listing itself may include historical data (a list of commodities traded or listed in the past and associated transaction information), current listings and their status, and future listings (e.g., commodities scheduled to be offered, but for which bidding is not yet permitted). The listing may be searched by fields, keywords or other search techniques.

In step 215, a potential purchaser or exchange partner accesses the exchange via a client terminal. The purchaser client presents a number of options. For example, the purchaser may search, obtain additional information, perform electronic chat (real-time or store/forward) bid and review (history/status). For example, the search function may enable the purchaser to search through the listing for items of interest. The purchaser may be provided with several fields of information that can be used to facilitate the search. These search fields may include classification (e.g., automobile, tool, furniture, etc.), price, terms or other fields or key words. The system may return either an exact match, the closest match, or an entire classification for the client to browse through.

The client may have the capability of browsing through the database using standard navigational tools. These options allow the client to quickly advance and review through the database. Items may be displayed in various views and in various orders. Once a desired items is identified, the buyer may obtain additional information about the listed item. For example, the client may be provided with a chat option. Chat enables electronic communication via the network and may provide the client with a real-time communication link with other buyers, the seller or the exchange host. Further, if the rules of the exchange provide, the chat may be either public (i.e., everyone viewing that particular item will be able to see the chat such as in a chat room) or it may be private (i.e., no one except the involved parties can see the chat). This option may be one of the exchange parameters.

Additional options may be provided to assist the client in managing the information. The client may be able to retrieve more information about a particular item that is being viewed. This may be useful when information for an item takes more than one screen to present. It may also allow the client to send an E-mail containing all of the information about the particular item being viewed to an E-mail address.

The potential purchaser may make a bid on an item that is currently being viewed and the information is processed in step 220. Once bid is selected, the client may be provided with the current highest bid for the item, and a window entering the required information for making a bid. In order to be accepted, the bid must meet certain criteria. For example, the bid must be higher than the current highest bid. The system may have rules in place that allow only predetermined increments (e.g., $0.50, $1, $10, etc.) depending on the particular estimated cost of the item. Same as all, rules can be enforced on the client side and others can be enforced at the external proxy or internal proxy. This enforcement may also include the initial filtering of information. For example, if a bid placed is not higher than the current highest bid, the client may not transmit the bid. Alternatively, the non-qualifying bid may be dropped at the external proxy. Thus, unnecessary communications to the server are avoided.

In another embodiment of the invention, bids are not transmitted to the host if they are irrelevant. Irrelevant bids may be bids that are less than the current "best" bid. In order to determine if the bid is relevant or not, the system determines what the seller's goal is (price, location, etc.) and then determines if the bid is more desirable to the seller than the current "best" bid. If it is, it replaces the "best" bid and the seller may be notified of the new highest bid. If it is not, the bid is disregarded. Notification may include a bid identifier, an amount and other information.

New "best" bids may be broadcast to all participants in the exchange. If a potential purchaser owns the "best" bid, he may also be notified of this status.

In step 225, the negotiations between the seller and all bidding parties are concluded. Negotiations may be concluded by expiration of the predefined exchange time, through seller intervention, through a match being achieved or other events.

In step 230, clearing process is performed. This may be tied to a clearing bank.

Clearing may be done in several fashions. One implementation of clearing is based on a simple process for modifying at least two items. The steps required in the actual process of modifying these items will be described in detail later. Internal clearing occurs when there is very little or no chance for the clearing process to fail, such as when the system directly controls all commodities in question. When there is internal clearing, the integrity of every trade on the system is protected at all times; that is, the system provides insurance or a guarantee of the trade completion. It is not possible for a participant to default after a trade is arranged. Since internal clearing is processed in real-time, the clients involved may proceed to the next negotiation immediately. External clearing occurs when at least one commodity to be cleared requires dealing with external systems or where there is a possibility of failure during the clearing process.

Figure 3:
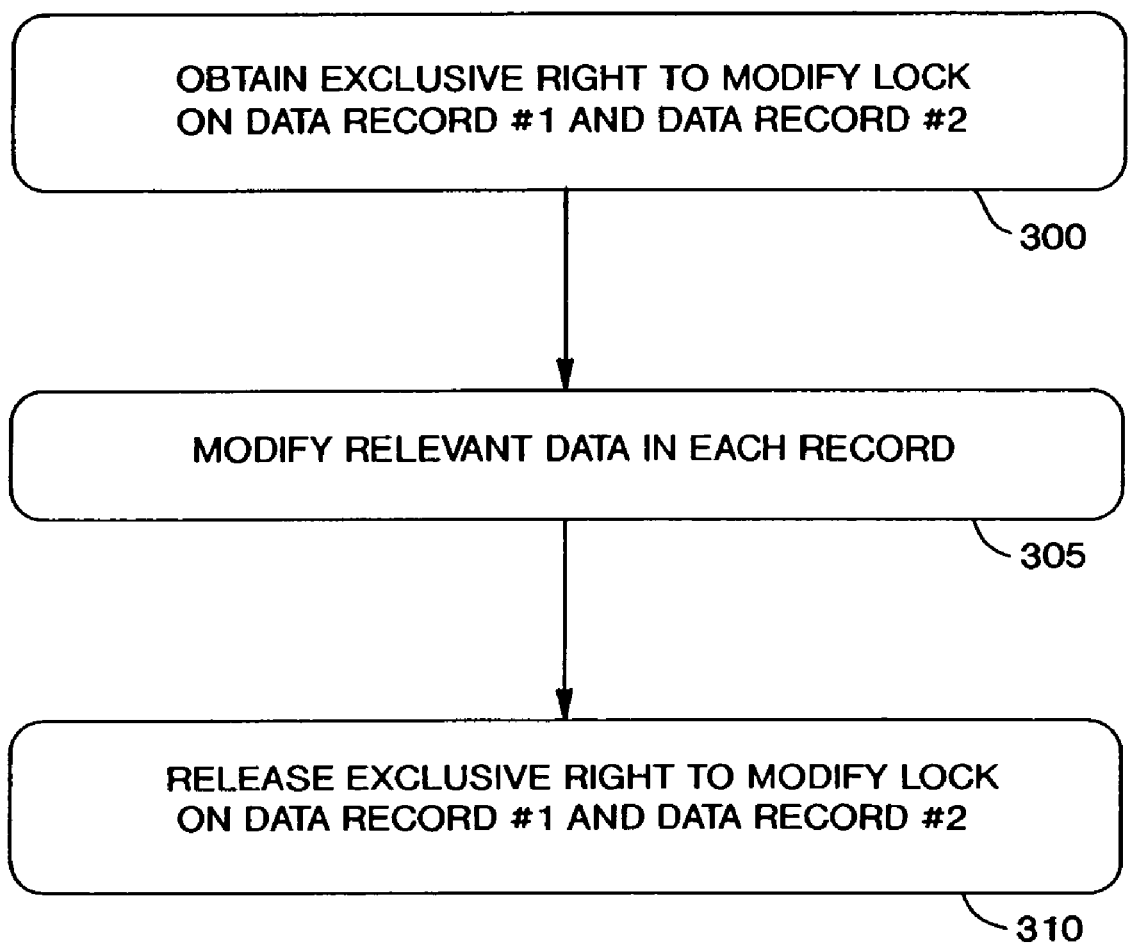
FIG. 3 is a flowchart of the internal clearing process.

Database 130 may have the ability to control the process of internal clearing. The present invention's implementation of clearing is based on a simple process for modifying at least two items. Referring to FIG. 3, the database can ensure the integrity of a trade by using the following process. First, in step 300, the system obtains the exclusive right to modify lock on data record #1 and on data record #2. This ensures that no process other than the internal clearing process can access the two data records. Next, in step 305, the system modifies the relevant data in each record. This may entail exchanging the information between the two locked records. In step 310, the system releases the exclusive right to modify lock on data record #1 and data record #2. The chronological order of the processes within a step is not significant, but each process of a step must be complete before moving to the next step and the steps must be completed in proper order.

Figure 4:
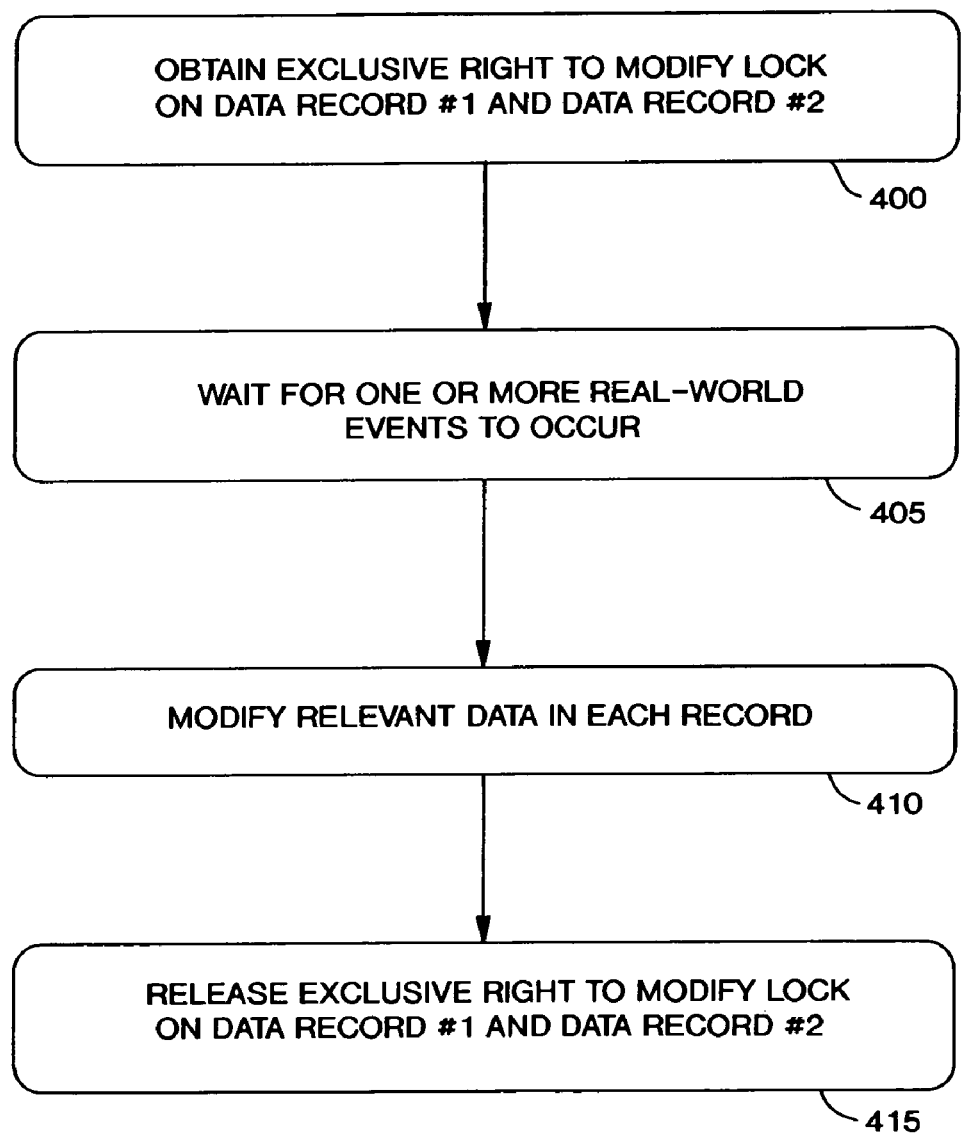
FIG. 4 is a flowchart of the external clearing process.

If internal clearing is not available, or if it is not desired, external clearing may be used. Referring to FIG. 4, an overview of the external clearing process is given. First, in step 400, the system obtains an exclusive right to modify lock on data record #1 and data record #2. In step 405, the system waits for one or more real-world events to occur. Real-world events may include a physical exchange of objects, a credit card validation, etc. Once this real-world event occurs, in step 410, the system modifies relevant data in each record. In step 415, the system releases the exclusive right to modify the lock on data record #1 and data record #2. At the completion of these steps, the external clearing process is complete.

In both situations, a third data record may be modified. This may be done in order to account for the system's commission. The commission may be measured in several ways: it may be a percentage of the selling price, paid by the buyer or seller, or both; it may be a fixed amount paid by the buyer or seller, or both, or may be any other suitable means for providing compensation. Based on the type of commission, data record #3, which may represent the system, is modified to include the amount of commission gained from this trade.

In addition to being internal or external, the clearing may also be direct or indirect. Direct clearing would be used when the items are directly transferred between the buyer's and the seller's accounts. Indirect clearing would be used when items are transferred to a third party or placed in escrow.

Figure 5:
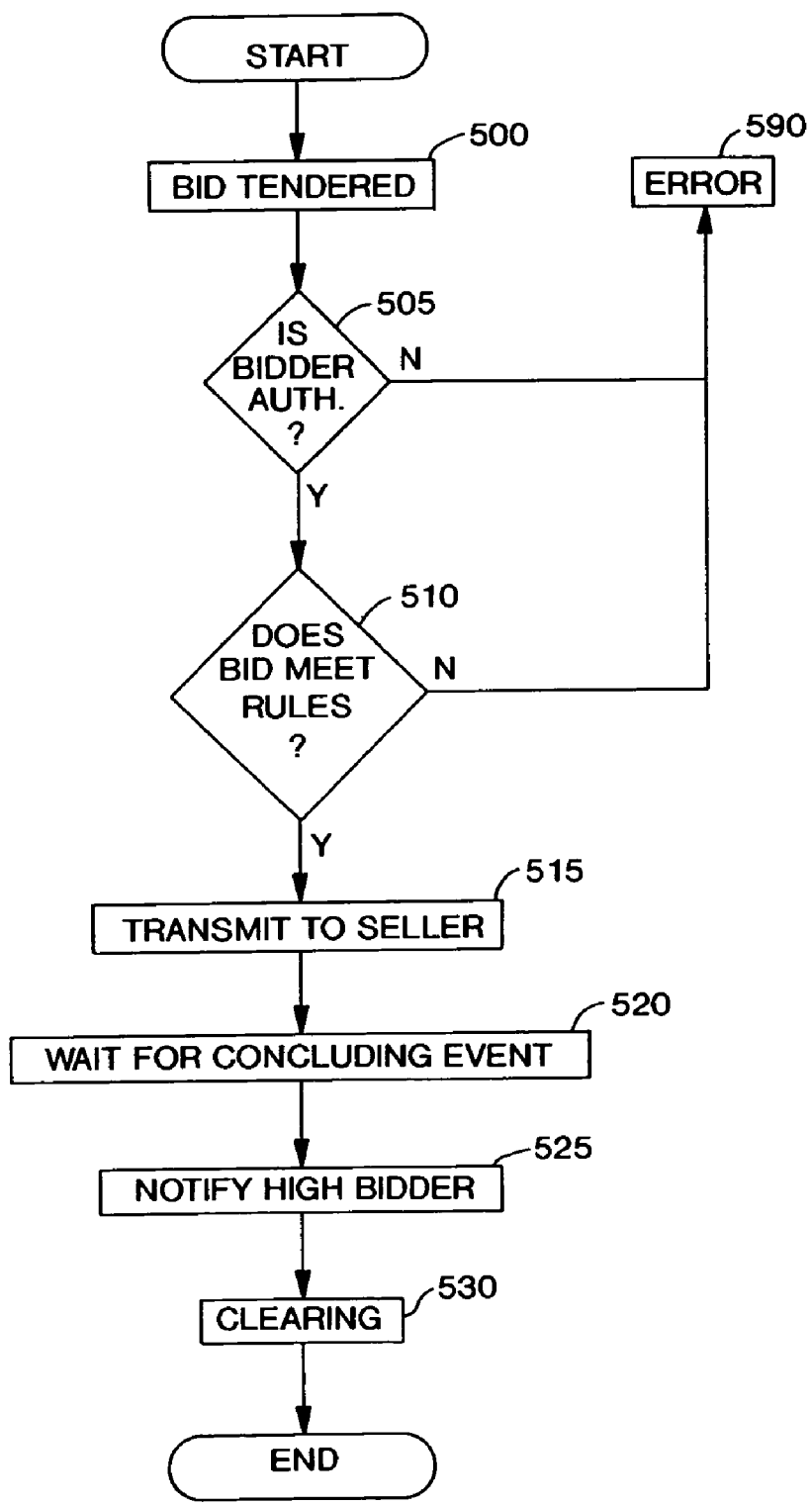
FIG. 5 illustrates the bidding process according to one embodiment of the invention.

Referring to FIG. 5, an illustration of the bidding process according to one embodiment of the invention is given. First, in step 500, the client bids on the item. In step 505, the system checks to see if the bidder is an authorized bidder. This may be based on the exchange rules set earlier by the seller. If the bidder is not an authorized bidder, an error message 590 is returned to the client. If the bidder is authorized, the process continues.

In step 510, the bid is checked to determine if it meets the rules, e.g., if it is greater than the current highest bid plus a predetermined increment. There may be other rules for determining whether the bid is valid. In one embodiment, the increment may be solely based on the bid on the item. For example, for items with bids of less that $100, bids may only be made in $1 increments; for items over $100, bids may only be made in $5 increments. In another embodiment, the bid increment may be determined based on the seller's estimated value of the item. In yet another embodiment, the increment may be set by the seller regardless of the bid or value of the item. If the bid is not greater than the highest bid plus a predetermined increment, an error message is returned to the client.

In step 515, the bid is transmitted to the seller or exchange. This may be done by electronic mail, by electronic messaging, or any suitable method.

In step 520, the system determines if a concluding event has occurred. This may be an expiration of time, by an exact match, by seller intervention, or any other suitable event. Once this occurs, the successful bidder is notified (step 525).

In another embodiment, the seller may have the option of not selling the item. This would allow the seller to retain control of his item should the best bid be unacceptable.

Once the bidder has been notified, the clearing process is initiated in step 530.

The standard client 170 of the invention may employ various graphical user interface, or GUI, components, artificial intelligence and agent-like behaviors for various functions. For example, a modified scroller is provided. In this modified scroller, displayed items move from one location to another, and depending on predetermined settings, the time may then either move off the display or be retained and remain visibly present in the display. If the item is not retained, then the scrolling area of the scroller is adjusted to be smaller by the size of the retained item. If enough items are retained so that the remaining display space is be insufficient for proper scroller display, then the retained items may scroll in order to accommodate the new item as necessary. Both the active and retained scrollers are able to be manually manipulated such that items that have been previously removed from the display may be brought back for a type of history review mechanism.

In a preferred embodiment, two scrollers may be linked or associated with each other via some binding and may use this binding or association to help display information in a new and unique way. There are at least three presentations of this scroller. The first presentation, is where the scrolling is in a similar direction, and another is where the scrolling is opposite direction. A center-out scroller, where the scrolling moves from the center to the outsides, may also be provided.

Any of these scrollers may have retained items as well. Dual scrollers may be extended to three or more scrollers linked by some association. These scrollers may also be in any orientation including an orthogonal perspective such as would be in a three dimensional environment.

Security is provided for this system at different levels. Any suitable means for providing security to the system may be used such as an encrypted stream-based network communication.

Referring again to FIG. 1, internal proxy component 140 also has the critical duty of handling communications with systems external to the invention, and may employ additional security, protocols, and filters. The proxy's filters are based on any field in the protocol, but primarily will be based on the bid, ask, and item classification fields. It may be desirable to not have direct communication between client 170 and exchange 120. All communication destined for exchange 120 is routed through proxies 140 and 150 to insure authorized and authenticated communication.

The external proxy 150 has the ability to connect to external systems and retrieve information based upon an external protocol in order to extract information that another component requires. For instance, the external proxy 150 handles incoming connections from client 170 using the invention's protocol, and it also has the ability to handle incoming connections from other outside sources such as E-mail, CGI scripts, telephone, fax or secondary clients with secondary protocols.

An example of this is using a web page on the World Wide Web to display information about a lot for exchange. The external proxy 150 can then extract appropriate information from the remote web page and pass this to listing service 140 which in turn will pass information to database 130 and exchange 120 as needed. The information that is required to be extracted is information that is sufficient to allow for an exchange to take place. This information is then embedded using the invention's standard protocol so that it can be extracted. Therefore, it would be possible to use the Hyper Text Markup Language (HTML) comment tokens to wrap the invention's required information.

Figure 6:
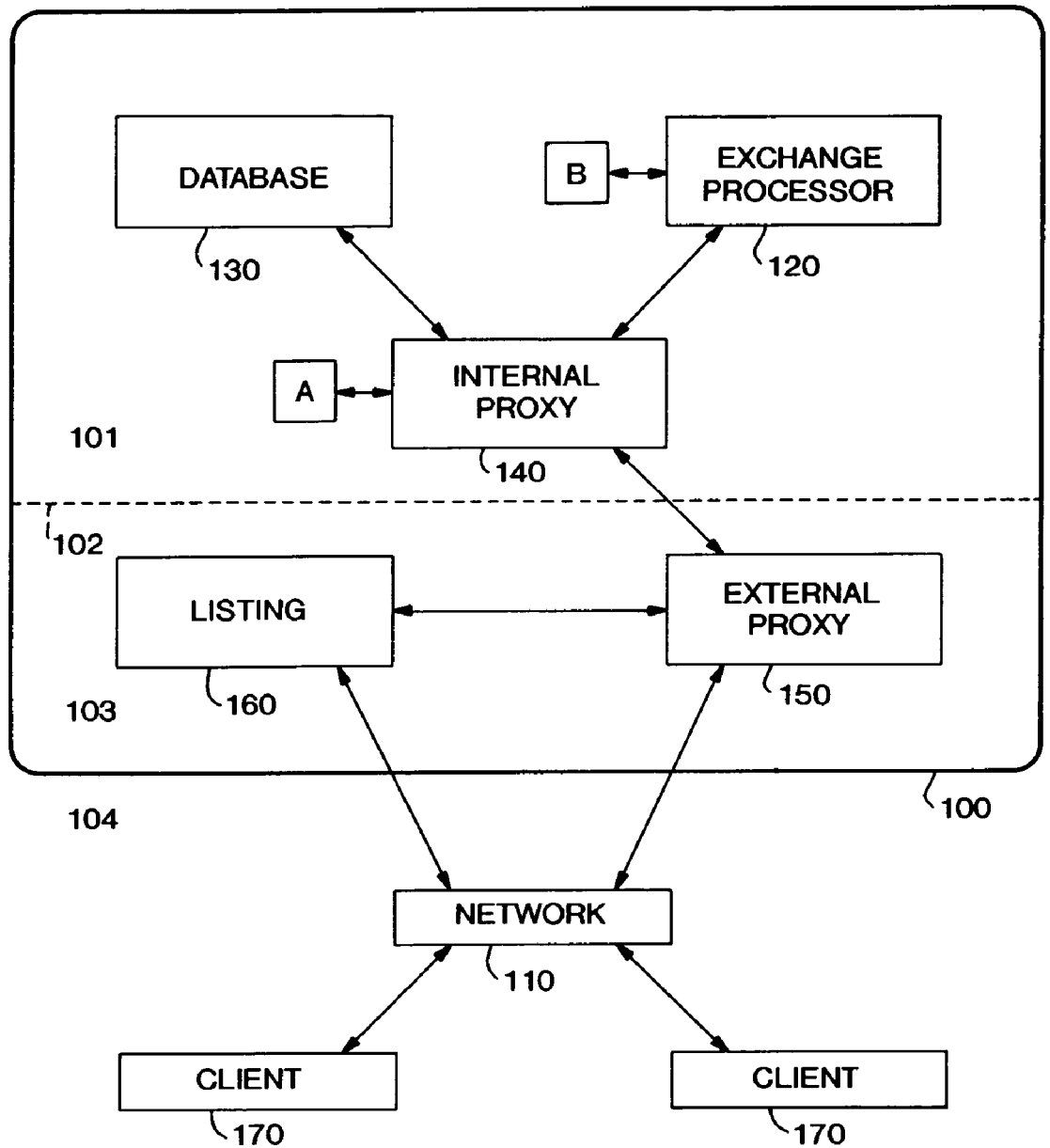
FIG. 6 is a system component layout diagram according to one embodiment of the invention.

Referring to FIG. 6, internal proxy 140 and exchange processor 120 are provided with additional processing. Box A represents the additional processing that applies to internal proxy 140. These processes may include a clearing processor, such as a clearing bank, electronic data interchange (EDI). Box B represents the additional processing that applies to exchange processor 120. These processes may include a partial matching processor, barter matching processor or a pooling processor. One or more of the internal or external proxy can be used for, among other things, verification of authenticity of bids, validity of bids (based on rules), filtering of bids for price, status/time, item identification and required information. Preferably, the internal proxy handles more advanced functions, including authorization, identification and final verifications. A single proxy may be used if desired. Two proxies permit load balancing. Processing may include routing of data and/or filtering, among other things.

Figure 7:
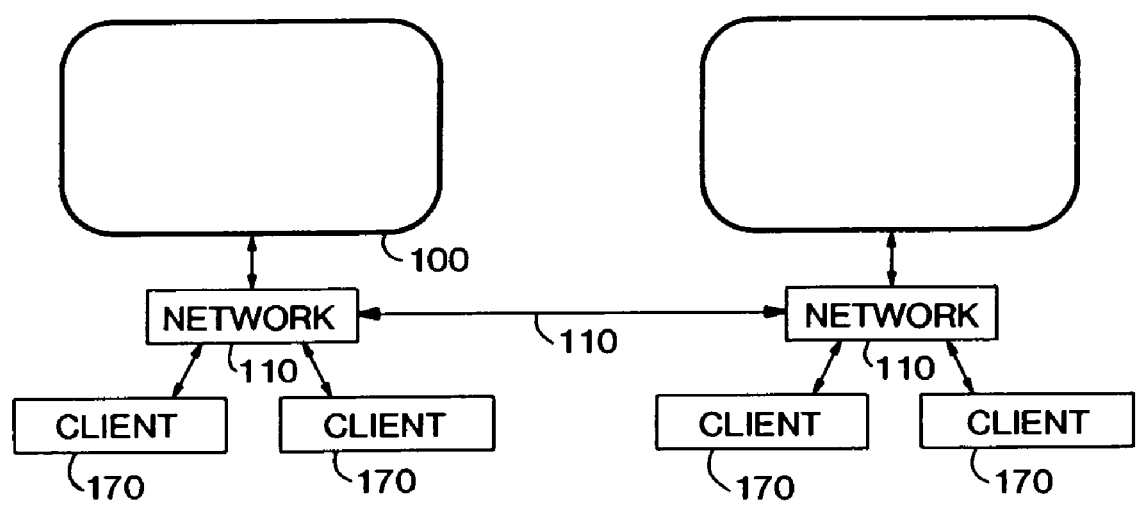
FIG. 7 is a system component layout diagram according to one embodiment of the invention.

Referring to FIG. 7, an example of how systems may interconnect is shown. In this embodiment, a plurality of exchange providers may be connected via network 110. Exchange provider 100 may actually host the exchange, and a plurality of exchange providers 100 may interact via network 110. Further, a plurality of clients 170 may be able to access exchange provider 100 and participate in the exchange.

Figure 8:
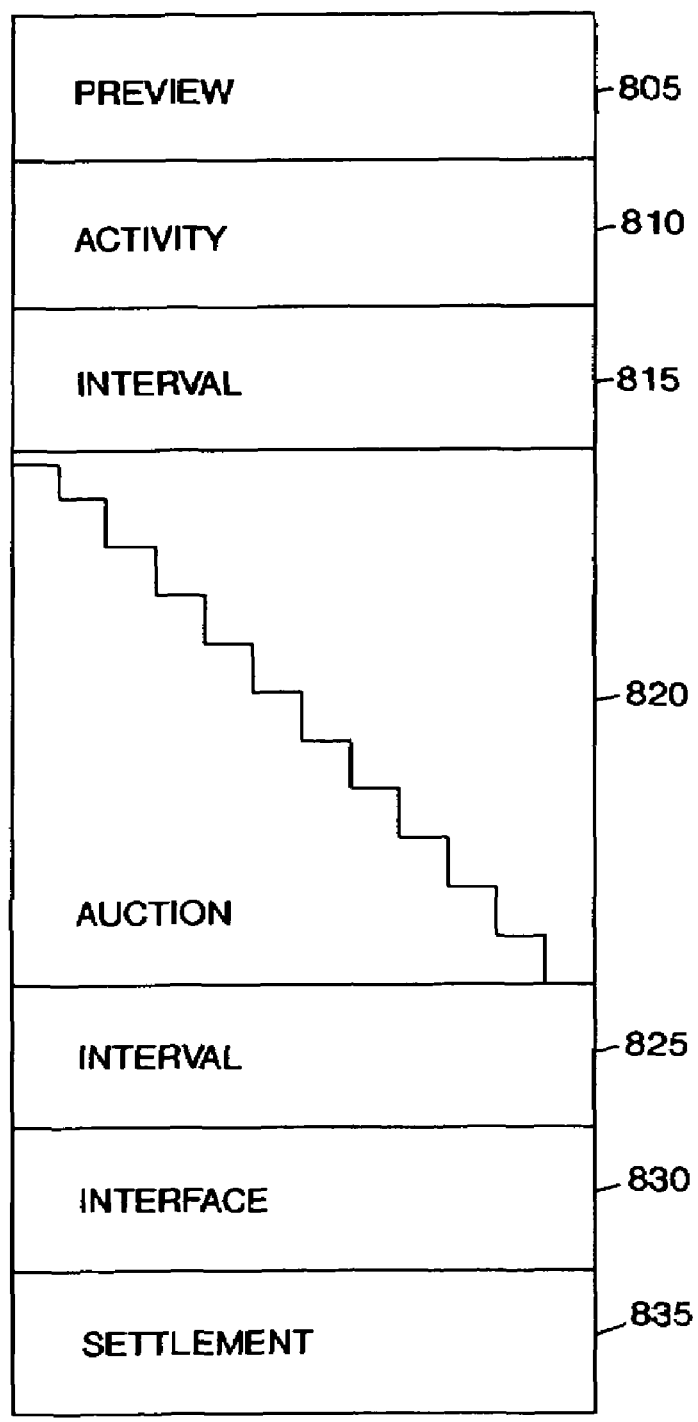
FIG. 8 illustrates an overview of the electronic auction phases.

A preferred embodiment of this invention is an electronic auction. Referring to FIG. 8, an overview of the electronic auction phases is given. The electronic auction is designed to emulate and surpass a real-world auctions' functions and capabilities. First, in step 805, the preview phase represents the start of an auction. A lot, or an item, preferably will have been entered by this time and when the auction is started, and it is immediately placed in the preview phase.

In step 810, the activity phase includes a calling for bids. If a lot is in this phase after a predetermined event and no bids are entered, the next phase is the settlement phase. If there is a bid, the auction moves to step 815, the first interval phase. This phase is provided to give a gap between the activity phase and the auction phase. It provides time to prepare for the auction phase by placing a resting bid. No active bidding is allowed during this phase. As in step 805, if there is no bid on the lot, the next phase is the settlement phase.

In step 820, the auction phase represents the termination of the ability of multiple bidders to bid in an individual auction. When there are multiple concurrent auctions, the starting and stopping times may be staggered based on factors such as, but not limited to, activity, bid volume, price, or category. The schedule is posted when finalized, which may occur during the first interval phase. Any outstanding resting bids are processed during this phase.

The second interval phase 825 is a gap between the auction phase and the interface phase. A new resting, or maximum, bid may be entered during this phase for use as a fail-safe during the interface phase 830. There is no active competitive bidding during this phase.

The interface phase 830 is the phase where the high bidder from the auction phase may have the ability to further bid in a second auction. If a resting, or maximum, bid was entered during interval 825 or during the second interface phase 830, it is used as a fail-safe during this phase in case of interface failure.

The settlement phase 835 is the phase where the results of each auction are finalized.

A simple auction has only auction phase 820 settlement phase 835. Other steps are included in order to promote fairness and active bidding. Step 825 and 830 may be used only when there is a need to tie a computer bidder to a second auction such as one hosted by a human auctioneer or direct buyer to seller negotiation.

The following are example embodiments:

An alternate embodiment of this invention is a paperless, brokerless real-time concurrent point and click trading of Securities and Exchange Commission (SEC) listed stocks where individuals acting as an individual, broker, or broker/dealer may buy or sell registered shares of stock without using a brokerage firm as an intermediary. Brokerless refers to the fact that participants are trading directly with other participants without brokerage firm or other third party assistance. Real-time means both the ability to offer shares of stock for sale or to purchase shares, and the results of bids on these offers is processed nearly instantaneously and thereby known almost immediately by all exchange participants. The system will consist of real-time price negotiation between buyer and seller with a price matching mechanism when an offer to buy or sell is first entered. Trading is concurrent and interactive for both buyer and seller. Both buyer and seller will use the bidding mechanism to raise or lower bids and offers. The participants may choose any listed item offering and place a bid if they wish to buy, or change aspects of their offering if they have offered to sell. This will allow electronic price negotiation between buyers and sellers, simulating the trading floors of the real-world exchanges. When an offer to buy or sell stock is first entered, a check is made by the system to see if there is a matching offer on the opposite side of the trade. This match will be for the same stock at the same price in tradable quantities. A similar check is made if an existing bid or offer on any shares of stock changes. If the system locates a match, a trade is consummated. The exchange system will include an extensive database for customer and trade information. The system will maintain and provide a record of all trades concerning the time of day, the parties involved, the price and number of shares traded, and any other information that is required such as required by a government regulatory agency such as the Securities and Exchange Commission (SEC). A bid history will be available for any stock traded that will include the most recent offer and bid price, the price and volume of the last trade, and the previous day (or week) history. The system will provide real-time trade information on a per-trade basis.

Another embodiment is the trading of "entertainment" stocks, options and futures. These stocks and options will be issued by the governing body of the trading floor on participants or entrants in real-world events. In no way will a stock or option indicate an ownership in the entity that serves as the symbol or name (i.e., sport stock in the Buffalo Bills). The stock or option value is merely an indication of perceived value derived by the trading floor members and market forces in this particular forum.

Only members of this trading floor will be allowed to trade. Registration is required to become a member of the trade floor, and members are assigned an account number which are kept in the trading forum's database. To commence trading, members must have sufficient funds in their account to pay for the stock purchase. The system will preclude any member from trading more stock or money than is in their account.

The "entertainment" refers to the excitement created or enthusiasm generated by the media over the anticipated outcome of a real-world event. This event must have multiple entrants but only one clearly-defined winner after a period of time. Small events may occur during this time duration that may help define the eventual winner. These small events will stimulate the trading of the entrant's stock. Depending on the trader's perceived value of how an entrant is fairing in relation to other entrants, during the trade period, will determine the value of any entrant's stock. An example of these events may include individual team games leading to a championship, political primaries leading to an election, or critic's review of Oscar-bound movies.

Stocks and options are issued in an initial offering of finite amount at a par value by the governing body. This initial offering of par value stock will be sold to trading floor members at the beginning of the time duration for the real-world event. Options to purchase specific amounts of stock from the governing body during the time period may also be issued. The proceeds of these sales will go into a dividend depository that will be paid to the stock shareholders of the winning entrant, entrants, or combinations set by the specific rules for a particular event. This dividend will be paid at the end of the time period.

As each entrant's issue becomes more subscribed, that particular stock will be assigned a symbol and moved to the trading floor to be traded on by the trade floor members. Trading on a particular symbol is done by either the owner of the stock offering to sell, or the governing entity may issue more stock on this open market. Trading will simulate real-world stock exchanges in that both sides of a trade (buyer and seller) may raise, lower, or cancel offers to trade in real-time. The trading floor clearing mechanisms will clear all trades and debit and credit the stock and money into the principal's accounts. Members may be limited to the amount of stock or the amount of money in their individual accounts.

When the winner of the real-world event is determined, the dividend is distributed according to the rules for this particular event. If the real-world event is reoccurring, the stock holders may be issued stock options that allow them to purchase the same amount of stock at the next issue at par value.

Another embodiment of this invention is a brokerless commodity exchange. The commodities traded may range from current contracts traded over commodity exchanges, such as the Chicago Board of Trade, to new contracts such as water rights, pollution credits, electric power, and petroleum derivatives, or commodities such as commodities such as information (i.e., "data") such as breaking new stories or knowledge such as from knowledge modeling and information brokers or others such as bananas, rubber, or computer chips. These commodity forums could be CFTC regulated, or independent.

The membership, trading, and clearing mechanisms for a commodity exchange are similar to the stock exchange embodiment. The differences would be in the nature of the commodities themselves as opposed to stocks. There may be commodities that require a physical settlement with no commodity exchange for money, or a cash settlement where no commodity changes hands.

Another embodiment is a barter exchange. This barter exchange may be based on a client-server system that provides real-time networked forum for barter. The clearing of the barter between members of the exchange would be arranged completely by the participants for the trade.

All sides of the barter must be members of the exchange. Membership requires that the applicant use the barter exchange system to submit the application form that contains specific identification, background, and financial information. Once the applicant is granted an exchange membership, an account number is assigned. A member must have funds or a line of credit established by a credit card available for debiting.

Members may negotiate in real-time for items. Either side of a trade may offer to increase, decrease, add items, remove items, or do any variation of trade that one is able to do in the real world. This will be accomplished by a listing function and a system priority chat. Anonymity will be preserved in forum until a barter is consummated. Upon the system verifying and transferring the commission to the exchange, which is charged for use of the forum, the identification of the principals are revealed to each other. The principles may then arrange the details of the exchange.

Another embodiment is an exchange for all types of domestic and foreign currencies and their derivatives. This could include arbitrage or direct swaps. Again, this exchange's membership, trading, and clearing mechanisms may operate in the same manner as the exchange system. However, differences may exist in the specific commodities that are traded and minor adjustments may be made to account for their particular attributes.

Another embodiment is an on-line gambling forum. A digital calcutta is a method of wagering on sporting events that are of public knowledge and generate interest. Calcutta wagering is based on an auction-style forum where all entrants of an event are auctioned to the highest bidder. This auction may be for an individual event, such as an automobile race, for a round, such as a golf tournament, or for a team championship. The proceeds of the auction are placed into a pool to be divided among the high bidders on the top four finishers in the event or round. There could be many calcuttas based on a single sporting event based on bid size, including minimum bid, maximum bid, and unlimited bid, or pool size, including maximum pool, minimum pool, and unlimited pool or may be based on any combination of bids size and pool size. The calcutta could also be based on the split of high bidders on the high finishers. The pool could be split among high bidders on several places down from the first-place winner.

The digital calcutta would serve as a mechanism for wagering on highly publicized sporting events over a computer and network. Examples may include the Indy 500, the Tour de France, Wimbeldon, World Cup, Master's, Olympic events, college basketball (NCAA playoffs). News media originates the enthusiasm necessary for these events to be well-published throughout large portions of the world. This, in turn, creates interest in wagering that could have a low entry level with a large payoff in the foreseeable future. The electronic auction forum for wagering on these events could generate its own excitement.

Another application for computerized wagering based on the outcome of real-world events is the use of a virtual interactive trading floor. This would allow the participants to become odds-makers and place wagers on any event they choose without going through an intermediary. The trading floor would provide a real-time forum for participants to negotiate odds, point spreads, winners, or any other form of wagering. The only criterion is that there must be a definitive outcome and that the method to determine this outcome is agreed upon by both parties.

A participant must register to become a member of the trading floor and be assigned an account. Before the participant would be allowed to place or offer a wager, the total amount of funds or credit necessary to cover this wager must be in his account. Once a wager is made, the total amount involved may be placed in the trading floor's depository. If the participant used a line of credit issued by a credit card, approval would be verified and the funds immediately transferred. The wager would be "locked" until the funds were transferred; this means that the participants could not reject the wager while the funds were being transferred. This transfer would take no longer than a few seconds. If, for any reason, funds were unavailable, the bet would be canceled. Once the event's outcome is determined, the wager would be settled and the winner's account would be credited via the trading floor's clearing mechanism. A small commission would be paid to the trading floor for every cleared wager.

If desired, artificial intelligence capability can be added to the buyer client to enhance its capabilities. For example, the buyer may use software agents to automatically search for items to bid on, may monitor bid status and/or closing items to automatically bid on items, without buyer intervention (subject to preset parameters by the buyer). Other functions can be added such as agent behaviors, single or multiple clients working together to address the market, and allow for the use of different sources of data such as on-line news tickers, information brokers and knowledge modeling databases. If desired, host-to host communication can be permitted. Multiple item lots may also be permitted.

In a preferred embodiment, a virtual online bank (VOB) may be provided. The VOB may be used to provide convenience to the traders anc credibility to the exchange. Margin services may be provided by the VOB to a client based on a predetermined criteria. This predetermined criteria may include the results of a credit check, past trading experience, etc. A client may be provided the option of visiting the VOB at any time during the access to the exchange.

Although the present invention has been described in detail, it should be understood that various changes, substitutions, and alterations can be made without departing from the intended scope as defined by the appended claims.

We claim:

1. A computer-implemented method for operating a real time networked exchange in which a financial instrument is traded from a first participant to a second participant, the method comprising:
   under control of instructions executed by at least one processor of a host server,
      configuring the host server on which the networked exchange is operated according to a mode of operations by:
         defining a start time of the exchange,
         defining a stop time of the exchange,
         defining rules of public access to the exchange, and
         providing a capability for the first participant to intervene in the exchange by terminating an offer of a trade;
      receiving from a first participant over a computer network an offer to trade the financial instrument, the financial instrument being in an account of the first participant at the exchange;
      receiving from a second participant over a computer network an offer to trade an item for the financial instrument, the item being in an account of the second participant at the exchange;
      associating the first participants offer with the second participant's offer; and
      clearing the trade between the first and second participants of the item for the financial instrument by:
         transferring the item traded by the second participant to the account at the exchange of the first participant,
         transferring the financial instrument to the account at the exchange of the second participant,
         making the financial instrument immediately available to the second participant for additional trading on the exchange, and
      making the item immediately available to the first participant for additional trading on the exchange.

2. The computer-implemented method of claim 1, wherein the mode of operations includes defining a minimum offer increment.

3. The computer-implemented method of claim 1, wherein the mode of operations defines a best offer.

4. The computer-implemented method of claim 3, further comprising comparing two or more offers to trade an item for the financial instrument to select the best offer as defined by the mode of operations.

5. A computer-implemented method for operating a networked exchange in which a stock, security, option, future, commodity, currency, or derivative is traded from a first participant to a second participant, the method comprising:
   under control of instructions executed by at least one processor of a host server,
      programming the host server to operate the networked exchange according to a mode of operations by:
         defining a start time of the exchange,
         defining a stop time of the exchange,
         defining rules of public access to the exchange, and
         providing a capability for the first participant to intervene in the exchange by terminating an offer of a trade;
      receiving from a first participant over a computer network an offer to trade the stock, security, option, future, commodity, currency, or derivative, the stock, security, option, future, commodity, currency, or derivative being in an account of the first participant at the exchange;
      receiving from the second participant over a computer network an offer to trade an item for the stock, security, option, future, commodity, currency, or derivative, the item being in an account of the second participant at the exchange;
      associating the first participant's offer with the second participant's offer; and
      clearing the trade between the first and second participants of the item for the stock, security, option, future, commodity, currency, or derivative by:
         transferring the item traded by the second participant to the account at the exchange of the first participant,
         transferring the stock, security, option, future, commodity, currency, or derivative to the account at the exchange of the second participant,
         in connection with the transfer of the stock, security, option, future, commodity, currency, or derivative, making the stock, security, option, future, commodity, currency, or derivative available to the second participant for additional trading on the exchange, and
         in connection with the transfer of the item, making the item available to the first participant for additional trading on the exchange.

6. The computer-implemented method of claim 5 in which clearing the trade is completed without submissions from outside the exchange.

7. The computer-implemented method of claim 5 in which receiving from the second participant over a computer network an offer to trade an item for the stock, security, option, future, commodity, currency, or derivative includes receiving an offer to purchase the stock, security, option, future, commodity, currency, or derivative for cash.

8. The computer-implemented method of claim 5 further comprising transferring funds from the first participant's account, from the second participant's account, or from both accounts to the exchange as a charge for the trade.

9. The computer-implemented method of claim 5 in which receiving from the second participant over a computer network an offer to trade an item for the stock, security, option, future, commodity, currency, or derivative includes receiving from the second participant over a computer network an offer to trade funds for the stock, security, option, future, commodity, currency, or derivative, and further comprising:
   providing an account at the exchange for the second participant, the account including funds equivalent to a purchase price of the stock, security, option, future, commodity, currency, or derivative; and
   providing an account at the exchange for the first participant, the account containing the stock, security, option, future, commodity, currency, or derivative, wherein both the second participant's funds and the stock, security, option, future, commodity, currency, or derivative are controlled by the exchange as required to provide completion of the clearing process in real time.

10. The computer-implemented method of claim 5 in which clearing the trade includes:
   obtaining an exclusive right to modify a lock on a first data record;
   obtaining an exclusive right to modify a lock on a second data record;
   altering data in said first data record and said second data records to indicate the trade;
   releasing said exclusive right to modify lock on a first data record; and
   releasing said exclusive right to modify lock on a second data record.

11. The computer-implemented method of claim 5 in which receiving from the second participant over a computer network an offer to trade an item for the stock, security, option, future, commodity, currency, or derivative includes receiving an automatic bid on behalf of the second participant without the second participant's intervention, the automatic bid being made a software agent acting in accordance with pre-specified criteria.

12. The computer-implemented method of claim 11 in which the software agent searches for the stock, security, option, future, commodity, currency, or derivative to trade for and monitors the second participant's bid status on stock, security, option, future, commodity, currency, or derivatives.

13. The computer-implemented method of claim 5 in which:
   receiving from the second participant over a computer network an offer to trade an item for the stock, security, option, future, commodity, currency, or derivative includes receiving from multiple second participants multiple offers; and
   associating the offer to trade the stock, security, option, future, commodity, currency, or derivative with the offer to trade an item for the stock, security, option, future, commodity, currency, or derivative includes associating the highest of the multiple offers with the offer to trade the stock, security, option, future, commodity, currency, or derivative.

14. The computer-implemented method of claim 5 in which receiving from the first participant over a computer network an offer to trade the stock, security, option, future, commodity, currency, or derivative includes receiving an offer from the first participant to trade the stock, security, option, future, commodity, currency, or derivative at a specified price.

15. The computer-implemented method of claim 5 in which receiving from the second participant over a computer network an offer to trade an item for the stock, security, option, future, commodity, currency, or derivative includes receiving from the second participant over a computer network an offer to trade cash, currency, a security, a stock, a derivative, or a commodity for the stock, security, option, future, commodity, currency, or derivative.

16. The computer-implemented method of claim 5 further comprising providing by the exchange an on-line electronic chat capability through which the second participant and the first participant can negotiate.

17. The computer-implemented method of claim 5 in which clearing the trade includes clearing the trade in real time and in which the exchange provides to exchange users information about offers to trade stock, security, option, future, commodity, currency, or derivatives and offers to trade items for stock, security, option, future, commodity, currency, or derivative and in which the information is updated in real time upon completion of the trade to reflect the real time clearing of the trade.

18. The computer-implemented method of claim 5 in which:
   receiving from a first participant over a computer network an offer to trade the stock, security, option, future, commodity, currency, or derivative includes receiving from the first participant an offer to trade the stock, security, option, future, commodity, currency, or derivative without an intermediary broker; and
   receiving from the second participant an offer to trade an item for the stock, security, option, future, commodity, currency, or derivative includes receiving from a second participant an offer to trade an item for the stock, security, option, future, commodity, currency, or derivative without an intermediary broker, the exchange providing a forum for a trade between the first participant and the second participant without using an intermediary broker.

19. The computer-implemented method of claim 5 in which receiving from the first participant over a computer network an offer to trade the stock, security, option, future, commodity, currency, or derivative includes changing an aspect of the offer before the offer is accepted.

20. The computer-implemented method of claim 5 in which associating by the exchange processor the first participant's offer with the second participant's offer includes matching in real time an offer from a first participant with an offer from a second participant to effect a trade of at least one stock, security, option, future, commodity, currency, or derivative.

21. The computer-implemented method of claim 5, wherein the mode of operations includes defining a best offer.

22. The computer-implemented method of claim 21, further comprising comparing two or more offers to trade an item for the stock, security, option, future, commodity, currency or derivative to select the best offer as defined by the mode of operations.

23. A computer-readable storage medium having computer-executable instructions stored thereon which, when executed on a computer, cause the computer to:

receive a mode of operations that specifies how an exchange is to be operated;
configure the exchange according to the received mode of operations by:
  defining a start time of the exchange,
  defining a stop time of the exchange,
  defining rules of public access to the exchange, and
  providing a capability for a first participant to intervene in the exchange by terminating an offer of a trade facilitated through the exchange;
receive from the first participant over a computer network an offer to trade a stock, security, option, future, commodity, currency, or derivative, the stock, security, option, future, commodity, currency, or derivative being in an account of the first participant at the exchange;
receive from a second participant over a computer network an offer to trade an item for the stock, security, option, future, commodity, currency, or derivative, the item being in an account of the second participant at the exchange;
associate by the computer, the first participant's offer with the second participant's offer; and
clear the trade between the first and second participants of the item for the stock, security, option, future, commodity, currency, or derivative by:
  transferring the item traded by the second participant to the account at the exchange of the first paragraph,
  transferring the stock, security, option, future, commodity, currency, or derivative to the account at the exchange of the second participant,
  in connection with the transfer of the stock, security, option, future, commodity, currency, or derivative, making the stock, security, option, future, commodity, currency, or derivative available to the second participant for additional trading on the exchange, and
  in connection with the transfer of the item, making the item available to the first participant for additional trading on the exchange.

24. The computer-readable storage medium of claim 23, wherein the mode of operations defines a best offer.

25. The computer-readable storage medium of claim 24, wherein the computer-executable instructions stored thereon, when executed on the computer, further cause the computer to compare two or more offers to trade an item for the stock, security, option, future, commodity, currency or derivative and to select the best offer as defined by the mode of operations.

26. A computer-implemented method of operating a real time networked exchange in which a stock, security, option, future, commodity, currency, or derivative is traded from a first participant to a second participant, the method comprising:
under control of instructions executed by at least one processor of a server computer,
  programming the server computer to operate the real time networked exchange according to a mode of operations by:
    defining a start time of the exchange,
    defining a stop time of the exchange,
    defining rules of public access to the exchange, and
    providing a capability for the first participant to intervene in the exchange by terminating an offer of a trade;
receiving from a first participant over a computer network an offer to trade the stock, security, option, future, commodity, currency, or derivative, the stock, security, option, future, commodity, currency, or derivative being in an account of the first participant at the exchange,
making the offer available in real time to be accepted by a second participant;
receiving from the second participant over a computer network an offer to trade an item for the stock, security, option, future, commodity, currency, or derivative, the item being in an account of the second participant at the exchange;
associating in real time the first participant's offer with the second participant's offer;
clearing the trade between the first and second participants of the item for the stock, security, option, future, commodity, currency, or derivative in real time by:
  transferring the item traded by the second participant to the account at the exchange of the first participant,
  transferring the stock, security, option, future, commodity, currency, or derivative to the account at the exchange of the second participant,
  making the stock, security, option, future, commodity, currency, or derivative available to the second participant for additional trading on the exchange,
  making the item available to the first participant for additional trading on the exchange; and
displaying in real time to participants in the exchange that the trade has been completed.

27. The computer-implemented method of claim 26, further comprising providing a communication channel for the first participant and the second participant to negotiate an exchange.

28. The computer-implemented method of claim 26, in which receiving an offer to trade an item for the stock, security, option, future, commodity, currency, or derivative, includes receiving an offer generated by an artificial intelligence in accordance with parameters specified by the second participant.

29. The computer-implemented method of claim 26, wherein the mode of operations defines a best offer.

30. The computer-implemented method of claim 29, further comprising comparing two or more offers to trade an item for the stock, security, option, future, commodity, currency or derivative to select the best offer as defined by the mode of operations.

* * * * *

UNITED STATES PATENT AND TRADEMARK OFFICE
CERTIFICATE OF CORRECTION

PATENT NO. : 7,672,892 B2  Page 1 of 1
APPLICATION NO. : 09/532684
DATED : March 2, 2010
INVENTOR(S) : James Michael Odom and Scott D. Yelich It is certified that error appears in the above-identified patent and that said Letters Patent is hereby corrected as shown below:

| Column, Line | Reads | Should Read |
|---|---|---|
| Page 3, Column 2 | ""World Wide Web," A Web of On-line Dictionaries, http:/www.facstaff.bucknell.edu/rbeard/diction.htmll, 1 page (printed Dec. 1998)" | --"World Wide Web," A Web of On-line Dictionaries, http:/www.facstaff.bucknell.edu/rbeard/diction.html, 1 page (printed Dec. 1998)-- |
| Column 13, Line 64 | "associating the first participants offer with the second" | --associating the first participant's offer with the second-- |
| Column 17, Line 27 | "the account at the exchange of the first paragraph," | --the account at the exchange of the first participant,-- |

Signed and Sealed this

Ninth Day of November, 2010

David J. Kappos
*Director of the United States Patent and Trademark Office*